US007957163B2

United States Patent
Hua et al.

(10) Patent No.: US 7,957,163 B2
(45) Date of Patent: Jun. 7, 2011

(54) CURRENT CONTROLLED SYNCHRONOUS RECTIFYING DRIVE CIRCUIT

(75) Inventors: Guichao Hua, Zhejiang (CN); Wu Xinke, Zhejiang (CN); Luo Changchun, Zhejiang (CN)

(73) Assignee: Inventronics (Hangzhou) Co., Ltd., Hangzhou, Zhejiang (CN)

( * ) Notice: Subject to any disclaimer, the term of this patent is extended or adjusted under 35 U.S.C. 154(b) by 232 days.

(21) Appl. No.: 12/397,909

(22) Filed: Mar. 4, 2009

(65) Prior Publication Data

US 2009/0262560 A1 Oct. 22, 2009

Related U.S. Application Data

(60) Provisional application No. 61/078,467, filed on Jul. 7, 2008.

(30) Foreign Application Priority Data

Apr. 22, 2008 (CN) .......................... 2008 1 0061336

(51) Int. Cl.
    *H02M 3/335* (2006.01)
(52) U.S. Cl. .................. 363/21.14; 363/21.06; 363/127
(58) Field of Classification Search ............... 363/21.06, 363/21.14, 22, 23, 89, 90, 127
    See application file for complete search history.

(56) References Cited

U.S. PATENT DOCUMENTS

| 4,502,104 A | * | 2/1985 | Mitchell | 363/26 |
| 6,185,114 B1 | * | 2/2001 | Matsumoto et al. | 363/21.06 |
| 6,462,965 B1 | * | 10/2002 | Uesono | 363/21.14 |
| 6,597,587 B1 | | 7/2003 | Poon et al. | |
| 6,813,166 B1 | * | 11/2004 | Chang et al. | 363/21.14 |
| 2009/0290397 A1 | * | 11/2009 | Hua et al. | 363/127 |

* cited by examiner

*Primary Examiner* — Jessica Han
(74) *Attorney, Agent, or Firm* — Terry M. Sanks; Beusse Wolter Sanks Mora & Maire, P.A.

(57) ABSTRACT

A current controlled synchronous rectifying drive circuit including a current transducer ST having a primary winding connected in series with a synchronous rectifier SR and having a secondary winding to detect a current signal of a synchronous rectifier SR, a signal shaping and reset circuit connected to the secondary winding of the current transducer ST to convert the synchronous rectifier SR's current signal into a voltage signal and shapes it into a pulse signal, a push-pull power amplifying circuit having an input end connected to the signal shaping and reset circuit and an output end connected to a gate of the synchronous rectifier SR to amplify a drive signal generated by the signal shaping and reset circuit to drive the synchronous rectifier SR, and a drive self-bias drive circuit having an input end connected to the secondary winding of the current transducer ST and an output end connected to the push-pull power amplifying circuit to store energy from the current transducer ST to generate a voltage source.

14 Claims, 4 Drawing Sheets

US 7,957,163 B2

CURRENT CONTROLLED SYNCHRONOUS RECTIFYING DRIVE CIRCUIT

CROSS-REFERENCE TO RELATED APPLICATIONS

This application claims priority of Chinese Patent Application No. 200810061336.3 filed Apr. 22, 2008, and U.S. Provisional Application No. 61/078,467 filed Jul. 7, 2008 which are incorporated herein by reference.

FIELD OF THE INVENTION

The present invention generally relates to a synchronous rectifying drive circuit. More specifically, it relates to a current controlled and synchronous rectifying drive circuit

BACKGROUND OF THE INVENTION

With the development of semiconductor technology, the demand for low voltage high current power supplies keeps increasing in order to reduce the power consumption of integrated circuits. When the output voltage of the power supply decreases, the forward voltage of the diode will increase, for example, the forward voltage of a Fast Recovery Diode (FRD) or a Super-fast Recovery Diode (SRD) could be up to 1.0~2.0 Volts (V). The increment could be approximately 0.6V even for a Schottky diode. As a result, the efficiency of the power supply will be lower. With the development of the synchronous rectifier and corresponding control technology, the application of synchronous rectifying technology is expanding quickly as it helps improve the efficiency, thermal performance, power density, manufacturability and reliability of power supplies.

Depending on the type of the drive signal, a synchronous rectifying function can be realized in two ways: voltage drive and current drive. For the voltage drive, the drive modes of different topologies vary a lot. The application of many topologies is limited and the drive signal is influenced by input voltage. Since a no-current feedback is not applicable in a discontinuous conduction mode (DCM), problems like circulating current will occur when the power supplies are connected in parallel.

For a current drive synchronous rectifier, it obtains the drive signal of synchronous rectifier by detecting current through itself. The synchronous rectifier turns on when detecting the forward current through it and turns off when the current reaches zero, and as a result, the reversed current cannot get through the synchronous rectifier. Like the diode, a synchronous rectifier features unilateral conduction and can be used in various circuitry topologies in power supplying converters. Therefore, the current drive synchronous rectifier has a great future. However, prior art current drive synchronous rectifying technology has many drawbacks such as considerable power consumption, complicated circuitry structure, low working frequency, not being easy to control etc., all of which hinder its application. As shown in FIG. 1, in a current controlled synchronous rectifying drive circuit with energy feedback (as disclosed in U.S. Pat. No. 6,597,587), the current transducer's secondary winding has three windings, two of which are used in energy feedback, and this makes it expensive and complicates the manufacturing process.

SUMMARY OF THE INVENTION

The present invention intends to solve the drawbacks of the prior art by providing a current controlled synchronous rectifying drive circuit with high efficiency. Towards this end, a current controlled synchronous rectifying drive circuit is disclosed having a current transducer ST having a primary winding connected in series with a synchronous rectifier SR and having a secondary winding to detect a current signal of a synchronous rectifier SR. A signal shaping and reset circuit is provided which is connected to the secondary winding of the current transducer ST to convert the synchronous rectifier SR's current signal into a voltage signal and shapes it into a pulse signal. Also included is a push-pull power amplifying circuit having an input end connected to the signal shaping and reset circuit and an output end connected to a gate of the synchronous rectifier SR to amplify a drive signal generated by the signal shaping and reset circuit to drive the synchronous rectifier SR. A drive self-bias drive circuit is also included having an input end connected to the secondary winding of the current transducer ST and an output end connected to the push-pull power amplifying circuit to store energy from the current transducer ST to generate a voltage source.

In another exemplary embodiment a current controlled synchronous rectifying drive circuit, includes a current transducer ST having a primary winding connected in series with a synchronous rectifier SR and having a secondary winding, and a signal shaping and reset circuit connected to the secondary winding of the current transducer ST. Also included are a push-pull power amplifying circuit having an input end connected to the signal shaping and reset circuit and an output end connected to a gate of the synchronous rectifier SR, and a drive self-bias drive circuit having an input end connected to the secondary winding of the current transducer ST and an output end connected to the push-pull power amplifying circuit.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the embodiments of the invention will be described and explained with additional specificity and detail through the use of the accompanying drawings in which.

DETAILED DESCRIPTION OF THE INVENTION

Figure 1:
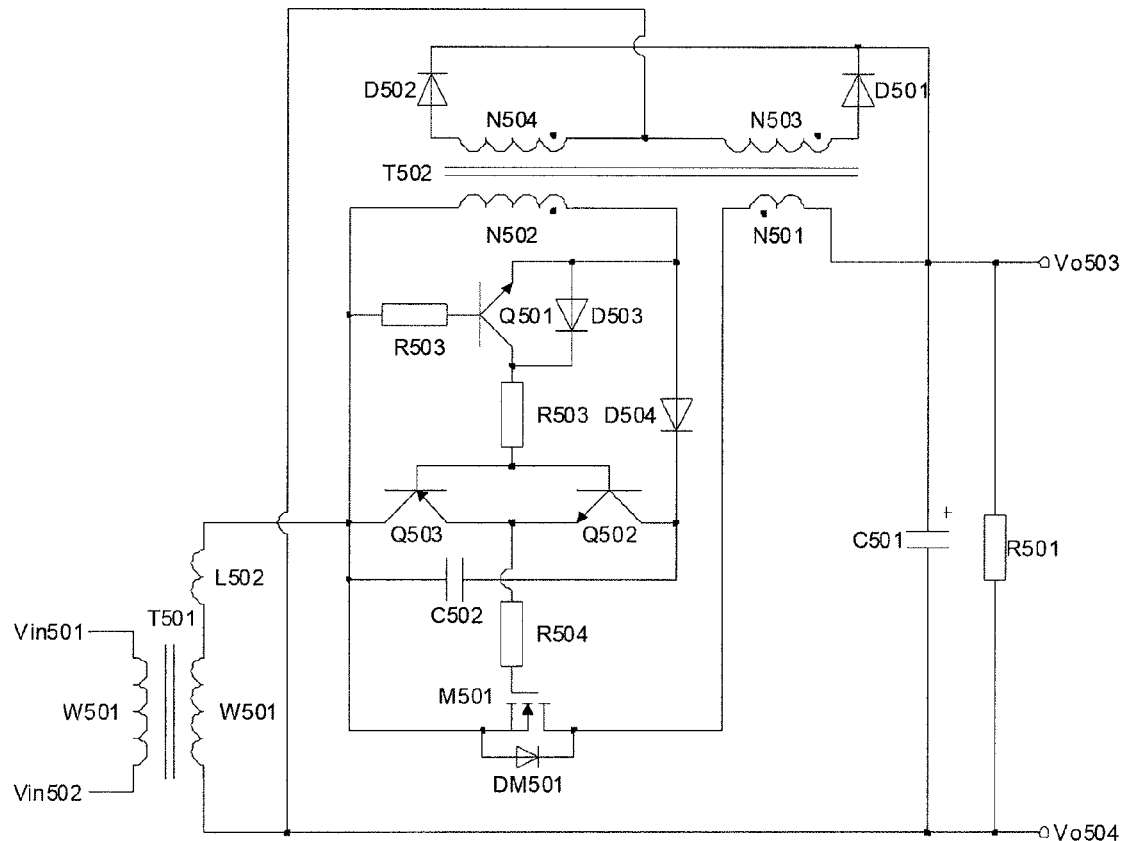
FIG. 1 is a prior art schematic diagram of the current controlled synchronous rectifying drive circuit.
Figure 2:
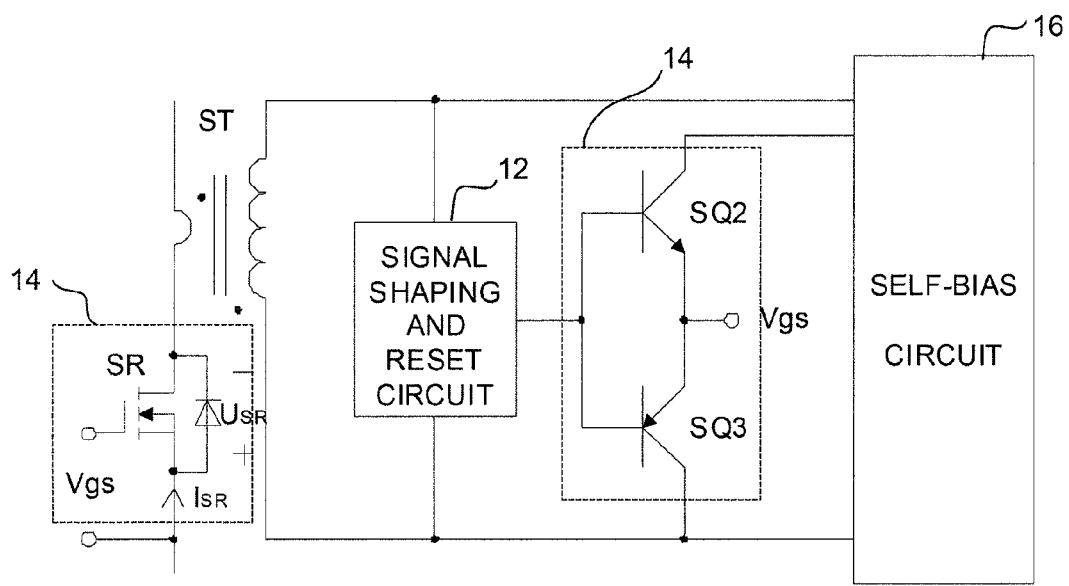
FIG. 2 is a block diagram of an exemplary embodiment of the current controlled synchronous rectifying drive circuit in the present invention.

FIG. 2 is a block diagram of a current controlled synchronous rectifying drive circuit in the present invention. The current controlled synchronous rectifying drive circuit with high voltage output comprises a current transducer ST, a signal shaping and reset circuit 12, a push-pull power amplifying circuit 14, and a drive self-bias circuit 16.

The current transducer ST is used to detect a current signal of the synchronous rectifier SR. Its primary winding is connected in series with the synchronous rectifier SR and the secondary winding is connected to the input end of the signal shaping and reset circuit 12.

The signal shaping and reset circuit 12 is used to convert the synchronous rectifier SR's current signal (which is detected by the current transducer ST) into voltage signal and shape it into a pulse signal; it also enables the current transducer ST to reset when the current of the synchronous rectifier SR reaches zero. The input end of the signal shaping and reset circuit 12 is connected to the secondary winding of current transducer ST and the output end is connected to the input end of the push-pull power amplifying circuit 14.

The push-pull power amplifying circuit 14 is used to amplify the drive signal generated by the signal shaping and reset circuit 12 to drive the synchronous rectifier SR. The input end of this circuit is connected to the signal shaping and reset circuit 12 while the output is connected to the gate of the synchronous rectifier SR.

The drive self-bias circuit 16 is used to store the energy from the current transducer ST in capacitor SC1 (disclosed in FIG. 3) to generate a voltage source which will regulate with the change of the current in the synchronous rectifier SR and power the whole drive circuit. The input end of the self-bias circuit 16 is connected to the secondary winding of the current transducer ST while the output end is connected to the push-pull power amplifying circuit 14.

In short, in the current controlled synchronous rectifying drive circuit in the present invention, the current transducer ST detects the current signal in the synchronous rectifier SR and converts it into a voltage signal, and further shapes it into pulse wave through the signal shaping and reset circuit 12, and then the drive voltage signal is amplified by the push-pull power amplifying circuit 14 to drive the synchronous rectifier SR, and stores energy in capacitor SC1 to power the drive circuit.

Compared with prior art technology, the present invention has made several improvements. For example, the secondary winding of the current transducer ST has only one winding, and this makes the circuit structure very simple, enabling it to develop towards high efficiency and integration and further to reduce the product cost. Additionally, as the drive voltage of the rectifying circuit regulates automatically with the change of the current in the synchronous rectifier SR, the drive voltage can get lower in light load mode, which reduces the power consumption of the synchronous rectifying drive. As a result, the light load efficiency is improved while the power consumption and cost are reduced as well. Also, the technology embodied in exemplary embodiments of the present invention can be widely used in innumerous topologies including a flyback circuit, a resonant half-bridge circuit, a forward circuit etc. A few exemplary embodiments of other topologies are disclosed herein. Those skilled in the art will also recognize that the current signal may be converted into the drive voltage signal via the signal shaping and reset circuit, thus enabling the current transducer ST to reset when the current of synchronous rectifier SR turns. The drive voltage signal may power the drive rectifier after being amplified via the push-pull power amplifying circuit. Last, the drive self-bias circuit may power the drive circuit itself.

Figure 3:
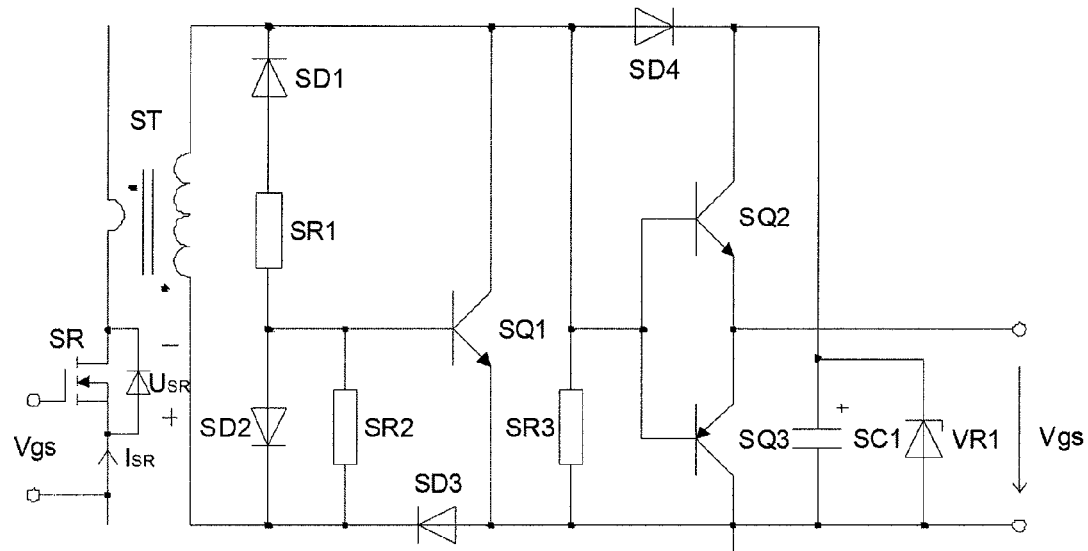
FIG. 3 is a schematic diagram of an exemplary embodiment of the current controlled synchronous rectifying drive circuit with high voltage output in the present invention.

FIG. 3 is a schematic diagram of the current controlled synchronous rectifying drive circuit with high voltage output in the present invention. The signal shaping and reset circuit 12 comprises diode SD1, diode SD2, diode SD3, resistor SR1, resistor SR2, resistor SR3 and transistor SQ1. The cathode of diode SD1 is connected to the non-dotted terminal of the secondary winding of current transducer ST, and to the collector of transistor SQ1 and one node of resistor SR3, while the anode is connected to resistor SR1. The other node of resistor SR1 is connected to the anode of diode SD2. One node of resistor SR2 is connected to the base of transistor SQ1. The cathode of diode SD2 is connected to the dotted terminal of the secondary winding of current transducer ST, and to the other node of resistance SR2 and the cathode of diode SD3. The anode of diode SD3 is connected to the emitter of transistor SQ1, and to the other node of resistance SR3 and to ground 20.

The current transducer ST detects the signal when current signal flows through synchronous rectifier SR and then converts it into drive voltage signal via resistor SR3 and diode SD3. When the current in synchronous rectifier SR turns zero, the secondary winding of current transducer ST is reset by resistor SR1, resistor SR2, diode SD1, diode SD2, while transistor SQ1 turns on to turn off the drive voltage signal at the same time.

The push-pull power amplifying circuit 14 comprises transistors SQ2 and SQ3, and drive synchronous rectifier SR with the power amplified drive voltage signal. In an exemplary embodiment the transistor SQ2 may be a NPN transistor, while transistor SQ3 may be a PNP transistor. The base of SQ2 is connected to the base of SQ3, and to the non-dotted terminal of the secondary winding of current transducer ST. The emitter of SQ2 is connected to the emitter of SQ3, and to the control pole of synchronous rectifier SR, while the emitter of SQ3 is connected to the ground 20.

The drive self-bias circuit 16 includes diode SD4, capacitor SC1 and Zener diode VR1. The anode of diode SD4 is connected to the non-dotted terminal of the secondary winding of current transducer ST, while its cathode is connected to the collector of transistor SQ2, and to one node of capacitor SC1, and the cathode of Zener diode. The other node of SC1 is connected to the anode of Zener diode VR1 and ground 20.

The input end of the drive self-bias circuit 16, connected to the secondary winding of current transducer ST, powers the drive circuit through the rectification of diode SD4 and the filter of capacitor SC1. Zener diode VR1 protects the synchronous rectifier SR from the overshoot of drive voltage. As the drive voltage of the rectifying circuit regulates automatically with the change of current in the synchronous rectifier SR, the drive voltage gets lower in light load mode, which reduces he power consumption of the synchronous rectifying drive. This is the most critical element of improving the light load efficiency and reducing the cost.

Figure 4:
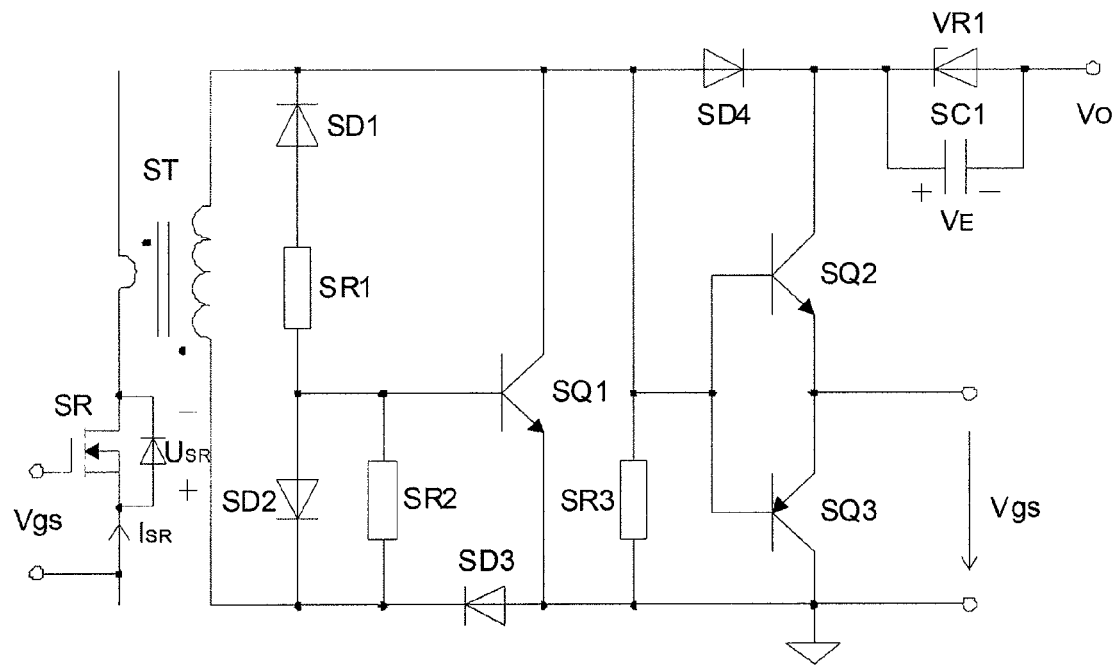
FIG. 4 is a schematic diagram of an exemplary embodiment of the current controlled synchronous rectifying drive circuit with low voltage output in the present invention.

Referring to FIG. 4, the current controlled synchronous rectifying drive circuit with low voltage output may include the current transducer ST, the signal shaping and reset circuit 12, the push-pull power amplifying circuit 14, and the drive self-bias circuit 16. Comparing the current controlled synchronous rectifying drive circuit and high voltage output with these embodiments as shown in FIG. 3, the main difference is that the filter capacitor SC1 and the Zener diode VR1 in the drive self-bias circuit 16 are placed in different locations. The drive self-bias circuit 16 includes diode SD4, capacitor SC1 and Zener diode VR1. The anode of diode SD4 is connected to the non-dotted terminal of the secondary winding of current transducer ST while the cathode is connected to the collector of transistor SQ2, and one node of capacitor SC1 and the cathode of Zener diode. The other node of capacitor SC1 is connected to the anode of the Zener diode VR1 and ground 20.

Figure 5:
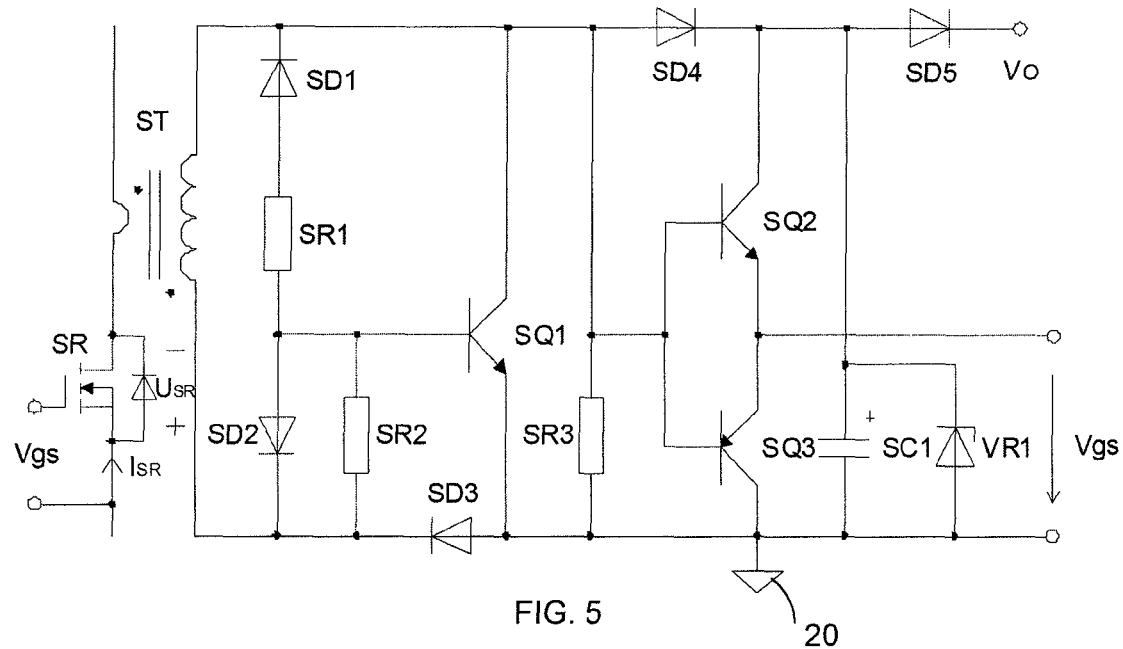
FIG. 5 is a schematic diagram of an exemplary embodiment of the current controlled synchronous rectifying drive circuit with self-bias in the present invention.

Referring to FIG. 5, the current controlled and synchronous rectifying drive circuit with self-bias may include the current transducer ST, the signal shaping and reset circuit 12, the push-pull power amplifying circuit 14, and the drive self-bias circuit 16. Comparing the current controlled synchronous rectifying drive circuit and high voltage output with these elements as shown in FIG. 3, the main difference is that diode SD5 is added in the drive self-bias circuit 16, and as a result, when the output voltage is low (such as but not limited to being below 20V), part of the power can be recycled to the load via diode SD5.

Figure 6:
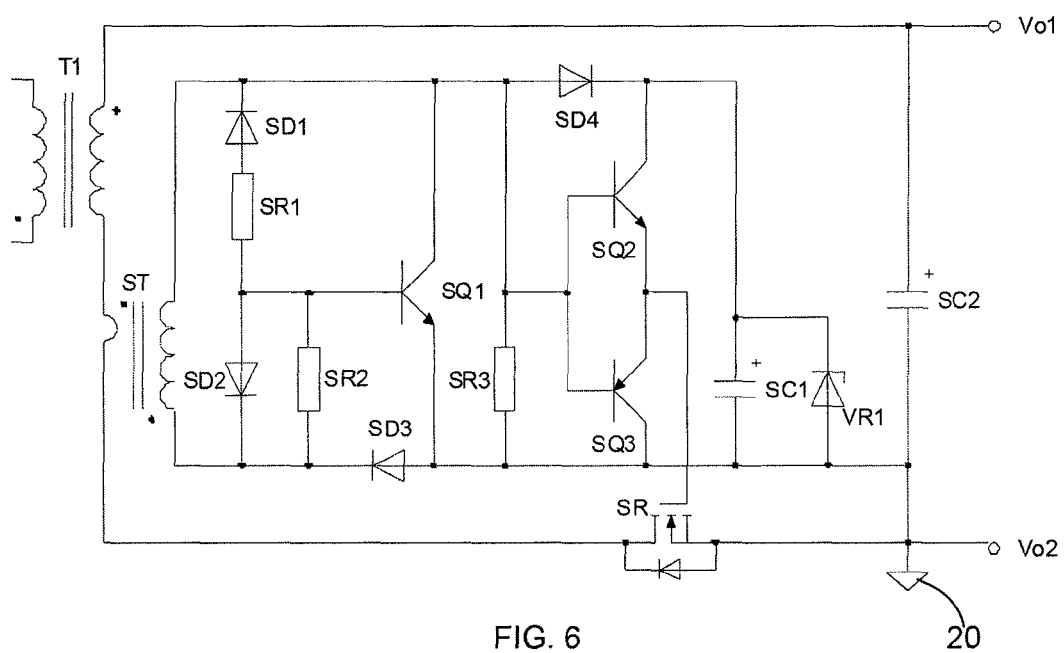
FIG. 6 is a schematic diagram of an exemplary embodiment of the embodiment of FIG. 3 provided in a flyback synchronous rectifying circuit.

Exemplary embodiments of the current controlled synchronous rectifying drive circuit with high voltage output as disclosed in FIG. 3 may be used in numerous configurations and/or circuits. For example, FIG. 6 shows the application of the embodiment demonstrated by FIG. 3 in a flyback synchronous rectifying circuit. As illustrated, a transformer T1 and a capacitor SC2 are further provided in the flyback synchronous rectifying circuit.

Figure 7:
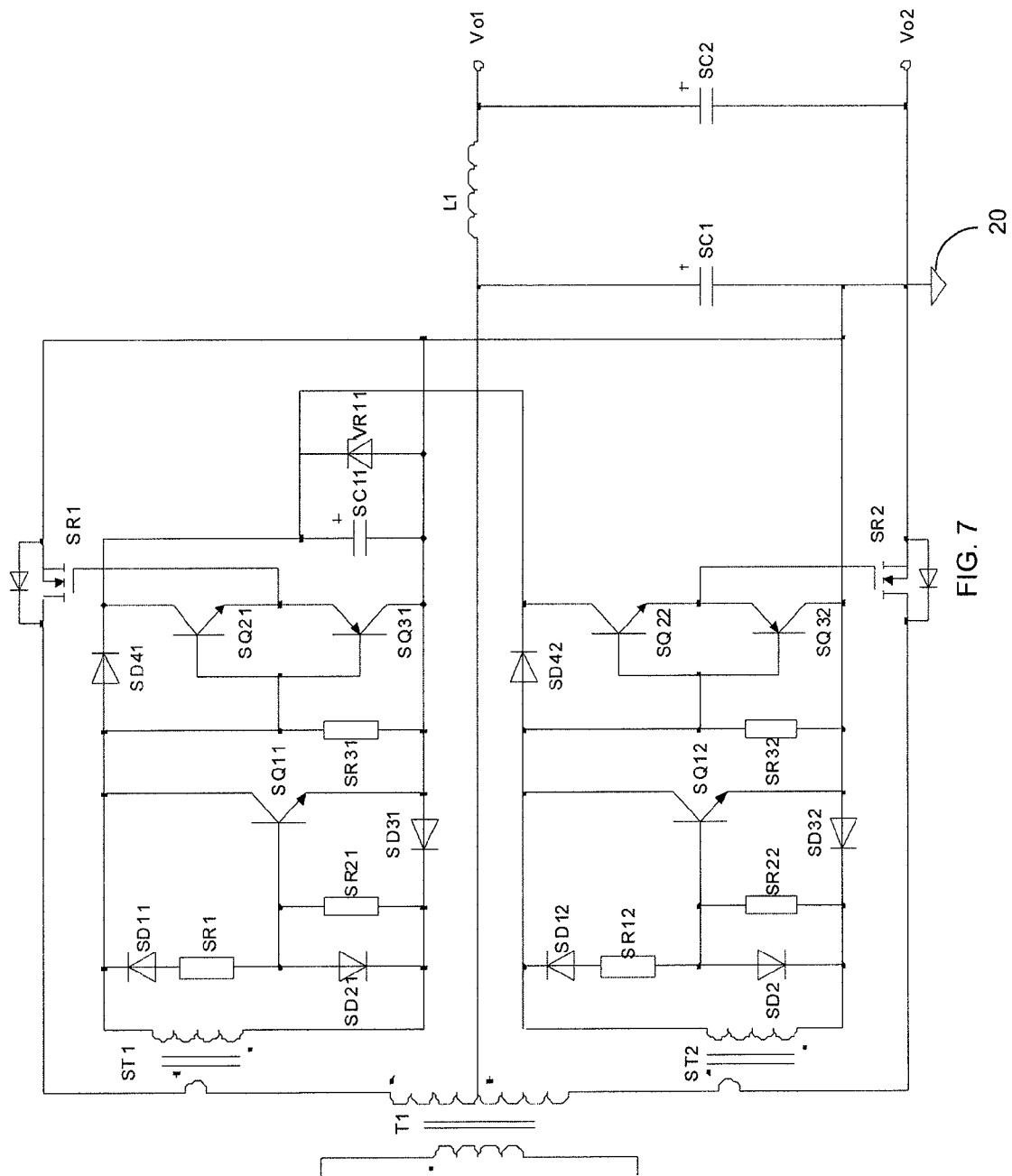
FIG. 7 is a schematic diagram of an exemplary embodiment of the embodiment of FIG. 3 provided in a half-bridge LLC synchronous rectifying circuit.

FIG. 7 shows another application of the embodiment demonstrated by FIGS. 3 and 4 in a half-bridge LLC synchronous rectifying circuit. Though the elements in FIG. 7 are provided with different designations, those skilled in the art will readily recognize that the half-bridge LLC synchronous rectifying circuit disclosed is a combination of the current controlled synchronous rectifying drive circuit with high voltage output, disclosed in FIG. 3, connected to the current controlled synchronous rectifying drive circuit with low voltage output, disclosed in FIG. 4. The current controlled synchronous rectifying drive circuit with high voltage output and the current controlled synchronous rectifying drive circuit with low voltage output share a capacitor SC11 and Zener diode VR11 of each circuit's drive self-bias circuit. A transformer T1 is also connected between the current controlled synchronous rectifying drive circuit with high voltage output and the current controlled synchronous rectifying drive circuit with low voltage output. In the current controlled synchronous rectifying drive circuit with high voltage output, the synchronous rectifier SR1 is connected in series to the dot-side of the primary winding of the current transducer ST1.

Exemplary embodiments of the present invention are demonstrated by, but not limited to the detailed embodiments described above where various modifications are possible. While the preferred embodiments has been described by way of example, it will be apparent to those skilled in the art that various modification may be made in the embodiments which should be regarded as the inventors' claims to be protected. Towards this end, it will be understood that examples are just the illumination of the present invention, but not limited to the invention. All extended solution or substitution based on the principle and content of this invention should be regarded as the inventors' claims to be protected.

What is claimed:

1. A current controlled synchronous rectifying drive circuit, comprising:
    a current transducer ST having a primary winding connected in series with a synchronous rectifier SR and having a secondary winding to detect a current signal of a synchronous rectifier SR;
    a signal shaping and reset circuit connected to the secondary winding of the current transducer ST to convert the synchronous rectifier SR's current signal into a voltage signal and shapes it into a pulse signal;
    a push-pull power amplifying circuit having an input end connected to the signal shaping and reset circuit and an output end connected to a gate of the synchronous rectifier SR to amplify a drive signal generated by the signal shaping and reset circuit to drive the synchronous rectifier SR; and
    a drive self-bias drive circuit having an input end connected to the secondary winding of the current transducer ST and an output end connected to the push-pull power amplifying circuit to store energy from the current transducer ST to generate a voltage source.

2. The current controlled synchronous rectifying drive circuit of claim 1, wherein the signal shaping and reset circuit comprises diodes SD1, SD2, SD3, resistors SR1, SR2, SR3 and transistor SQ1;
    wherein a cathode of diode SD1 is connected to a non-dotted terminal of the secondary winding of a current transducer ST, and to a collector of transistor SR1 and one node of resistor SR3, while an anode of diode SD1 is connected to resistor SR1, and another node of resistor SR1 is connected to the anode of diode SD2;
    wherein one node of resistor SR2 is connected to a base of transistor SQ1;
    wherein a cathode of diode SD2 is connected to the dotted terminal of the secondary winding of current transducer ST, and to another node of resistor SR2 and a cathode of diode SD3; and,
    wherein an anode of diode SD3 is connected to an emitter of transistor SQ1, and to another node of resistance SR3 and a ground.

3. The current controlled synchronous rectifying drive circuit of claim 1, wherein the push-pull power amplifying circuit comprises a NPN transistor SQ2, a PNP transistor SQ3, a drive synchronous rectifier SR with a power amplified drive voltage signal, wherein a base of NPN transistor SQ2 is connected to a base of PNP transistor SQ3, and to a non-dotted terminal of the secondary winding of current transducer ST and an emitter of NPN transistor SQ2 is connected to an emitter of PNP transistor SQ3, and to a control pole of synchronous rectifier SR, while an emitter of PNP transistor SQ3 is connected to a ground.

4. The current controlled synchronous rectifying drive circuit of claim 1, further comprising a diode SD4, a capacitor SC1, and a Zener diode VR1.

5. The current controlled synchronous rectifying drive circuit of claim 4, wherein an anode of diode SD4 is connected to a non-dotted terminal of the secondary winding of current transducer ST while a cathode of diode SD4 is connected to a collector of a transistor SQ2, to one node of capacitor SC1 and to a cathode of Zener diode, and another node of capacitor SC1 is connected to an anode of the Zener diode VR1 and a ground.

6. The current controlled synchronous rectifying drive circuit of claim 5, further comprising a driving self-powered circuit comprising a diode SD5, wherein an anode of diode SD5 is connected to a cathode of diode SD4 and a cathode of diode SD5 is connected to a positive pole of the output.

7. The current controlled synchronous rectifying drive circuit of claim 4, wherein an anode of diode SD4 is connected to the non-dotted terminal of the secondary winding of the current transducer ST while a cathode of diode SD4 is connected to a collector of transistor SQ2, to one node of capacitor SC1 and to the cathode of Zener diode, and another node of capacitor SC1 is connected to the anode of the Zener diode VR1 and the positive pole of the output.

8. The current controlled synchronous rectifying drive circuit of claim 1, wherein the signal shaping and reset circuit enables the current transducer ST to reset when the current of the synchronous rectifier SR is zero.

9. The current controlled synchronous rectifying drive circuit of claim 1, wherein the current signal of the synchronous rectifier SR is detected by the current transducer ST.

10. The current controlled synchronous rectifying drive circuit of claim 1, wherein the drive self-bias drive circuit further comprises a capacitor SC1 to store energy from the current transducer ST.

11. The current controlled synchronous rectifying drive circuit of claim 1, wherein the voltage source generated from the energy stored is provided to regulate with a change of current in the synchronous rectifier SR and to power the whole drive circuit.

12. A current controlled synchronous rectifying drive circuit, comprising:
   a current transducer ST having a primary winding connected in series with a synchronous rectifier SR and having a secondary winding;
   a signal shaping and reset circuit connected to the secondary winding of the current transducer ST;
   a push-pull power amplifying circuit having an input end connected to the signal shaping and reset circuit and an output end connected to a gate of the synchronous rectifier SR; and
   a drive self-bias drive circuit having an input end connected to the secondary winding of the current transducer ST and an output end connected to the push-pull power amplifying circuit;
   wherein the drive self-bias drive circuit stores energy from the current transducer ST to generate a voltage source.

13. A current controlled synchronous rectifying drive circuit, comprising:
   a current transducer ST having a primary winding connected in series with a synchronous rectifier SR and having a secondary winding;
   a signal shaping and reset circuit connected to the secondary winding of the current transducer ST;
   a push-pull power amplifying circuit having an input end connected to the signal shaping and reset circuit and an output end connected to a gate of the synchronous rectifier SR; and
   a drive self-bias drive circuit having an input end connected to the secondary winding of the current transducer ST and an output end connected to the push-pull power amplifying circuit;
   wherein the drive self-bias drive circuit further comprises a capacitor SC1 to store energy from the current transducer ST.

14. The current controlled synchronous rectifying drive circuit of claim 12, wherein the voltage source generated from the energy stored is provided to regulate with a change of current in the synchronous rectifier SR and to power the whole drive circuit.

* * * * *